United States Patent
De Luca

(10) Patent No.: US 9,849,922 B2
(45) Date of Patent: Dec. 26, 2017

(54) METHOD TO CONTROL A HIGH PERFORMANCE ROAD VEHICLE EQUIPPED WITH A REAR SPOILER HAVING AT LEAST ONE ADJUSTABLE AERODYNAMIC PROFILE

(71) Applicant: Ferrari S.p.A., Modena (IT)

(72) Inventor: Marco De Luca, Modena (IT)

(73) Assignee: Ferrari S.p.A., Modena (IT)

( * ) Notice: Subject to any disclaimer, the term of this patent is extended or adjusted under 35 U.S.C. 154(b) by 528 days.

(21) Appl. No.: 13/774,148

(22) Filed: Feb. 22, 2013

(65) Prior Publication Data

US 2013/0226414 A1    Aug. 29, 2013

(30) Foreign Application Priority Data

Feb. 24, 2012   (IT) .............................. BO2012A0089

(51) Int. Cl.
    *B62D 35/00*    (2006.01)
    *B62D 37/02*    (2006.01)

(52) U.S. Cl.
    CPC ........... *B62D 35/007* (2013.01); *B62D 37/02* (2013.01)

(58) Field of Classification Search
    USPC .......................................... 296/180.1–180.5
    See application file for complete search history.

(56) References Cited

U.S. PATENT DOCUMENTS

| | | | |
|---|---|---|---|
| 4,810,022 A | | 3/1989 | Takagi |
| 7,770,962 B1 * | | 8/2010 | Maxwell .................... 296/180.5 |
| 2011/0148143 A1 | | 6/2011 | Ondracek |
| 2011/0301825 A1 * | | 12/2011 | Grajkowski et al. ......... 701/102 |

FOREIGN PATENT DOCUMENTS

| WO | WO-2010/030158 A1 | 3/2010 |
|---|---|---|
| WO | WO 2010030158 A1 * | 3/2010 |

OTHER PUBLICATIONS http://www.racecar-engineering.com/articles/f1/drs-the-drag-reduction-system/Racecar Engineering—DRS: The Drag Reduction System explained by Sam, Mar. 30, 2011.*
http://www.neoseeker.com/forums/34756/t1626363-oversteering-understeering/Neoseeker—Oversteering/Understeering (in Gran Tursimo 5) by HU1CH13, Mar. 7, 2011.*
"Italian Application Serial No. IT BO20120089, Search Report dated Sep. 21, 2012"; 7 pgs.

* cited by examiner

*Primary Examiner* — John R Olszewski
*Assistant Examiner* — Tommy Worden
(74) *Attorney, Agent, or Firm* — Schwegman Lundberg & Woessner, P.A.

(57) ABSTRACT

A method to control a high performance road vehicle equipped with a rear spoiler that has at least one adjustable aerodynamic profile, the control method includes the steps of: detecting the tendency to oversteer or understeer when cornering, adjusting the setting of the adjustable aerodynamic profile of the rear spoiler to a greater angle of incidence in order to increase the overall downforce generated by the rear spoiler if oversteering is detected when cornering, and adjusting the setting of the adjustable aerodynamic profile of the rear spoiler to a lower value of the angle of incidence in order to reduce the overall downforce generated by the rear spoiler if understeering is detected when cornering.

20 Claims, 8 Drawing Sheets

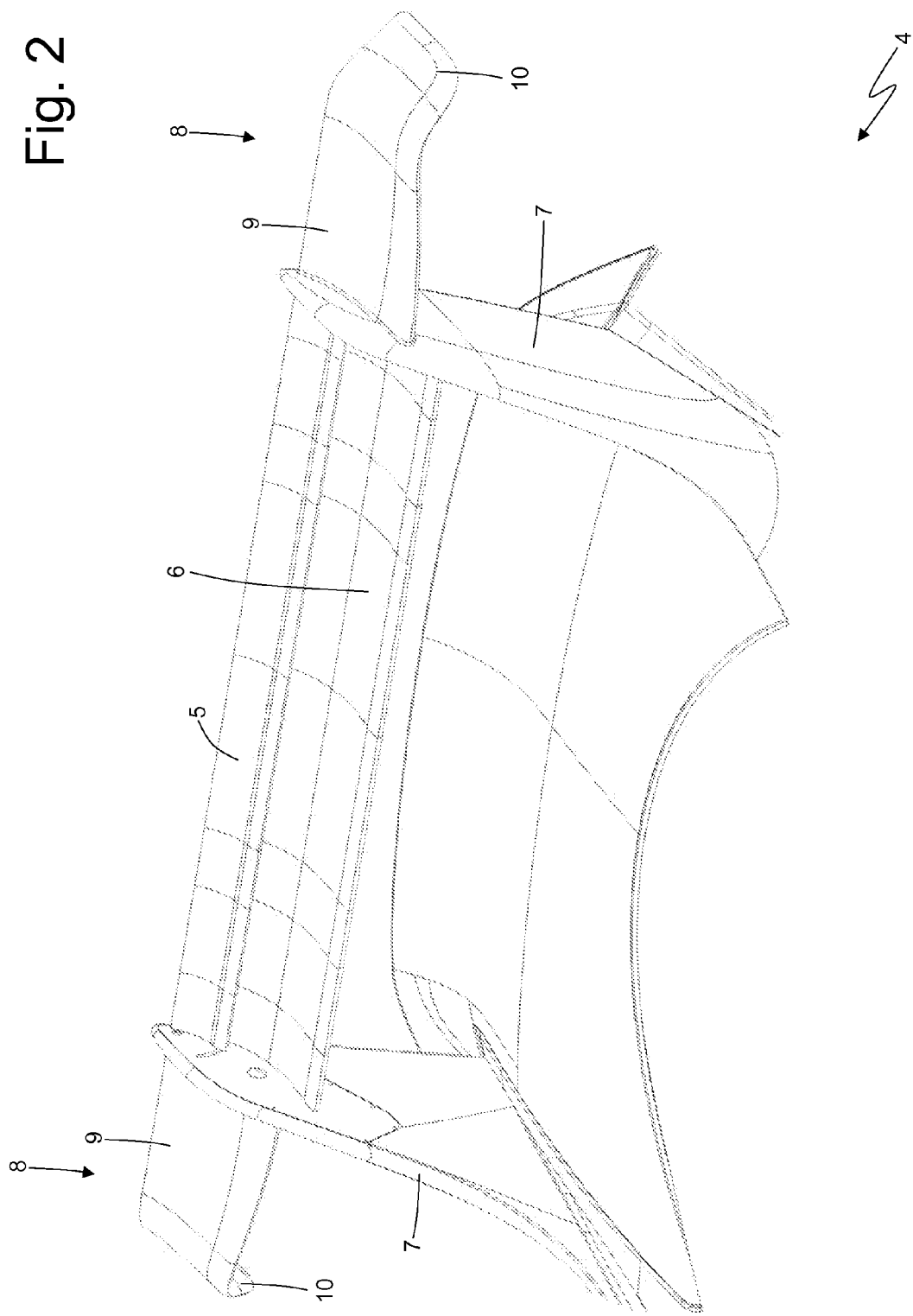

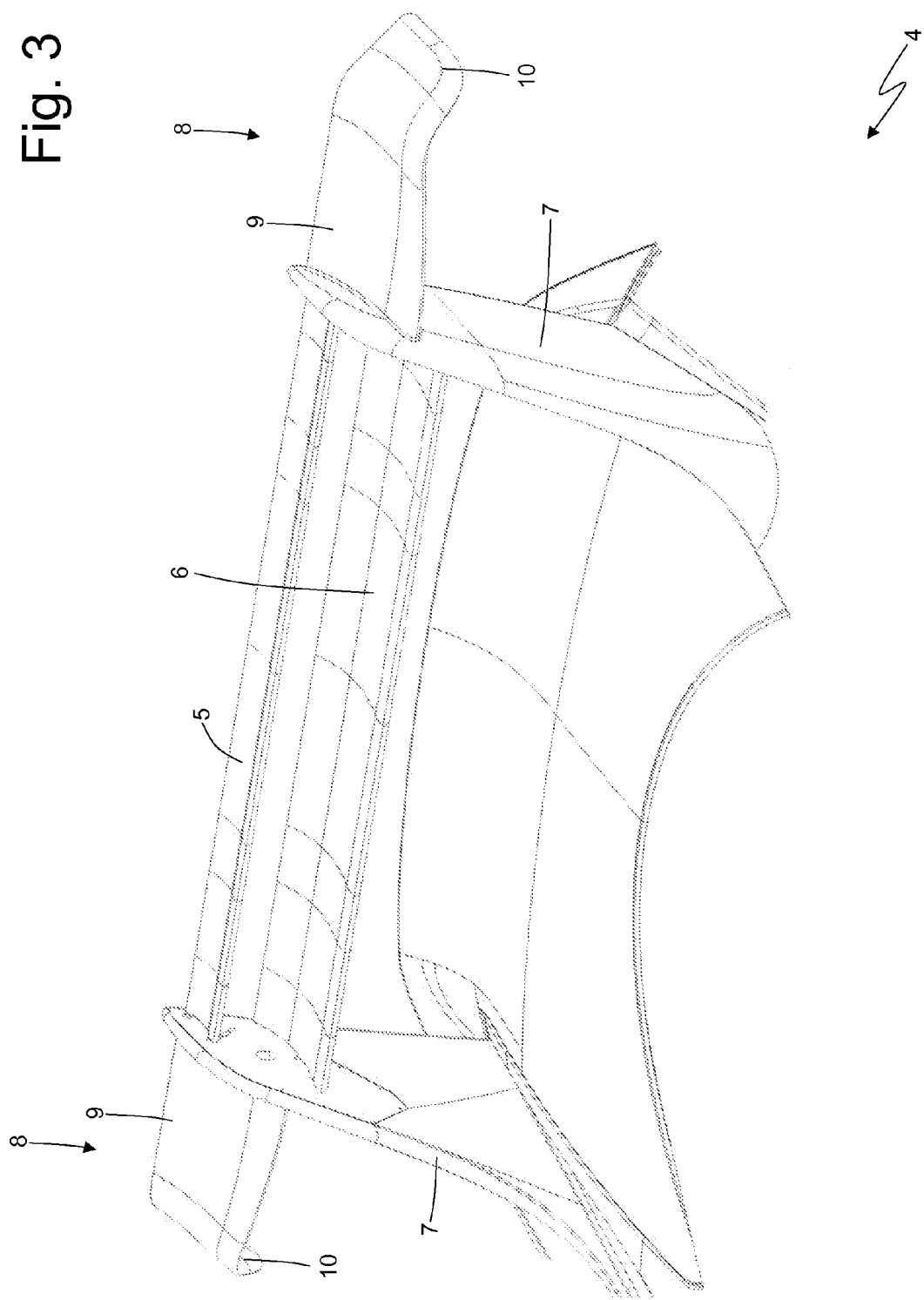

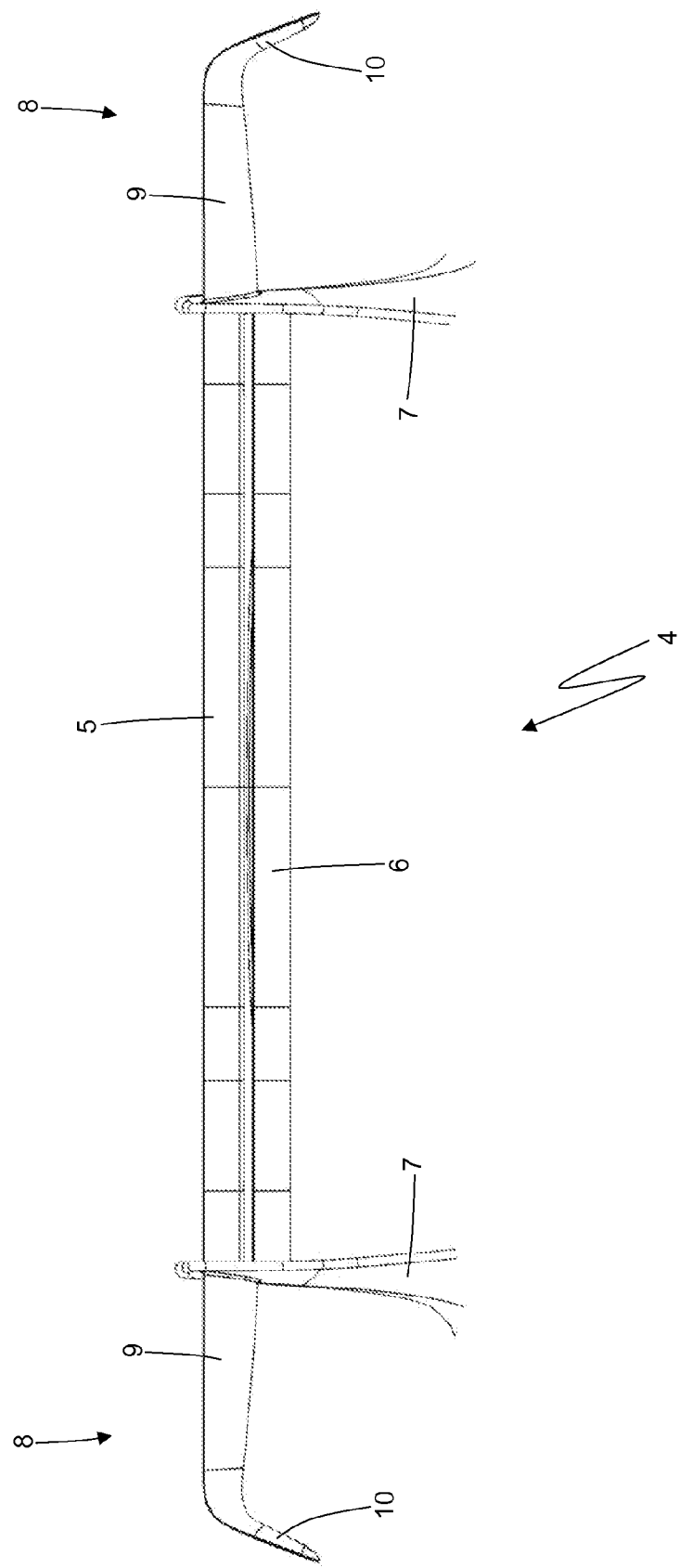

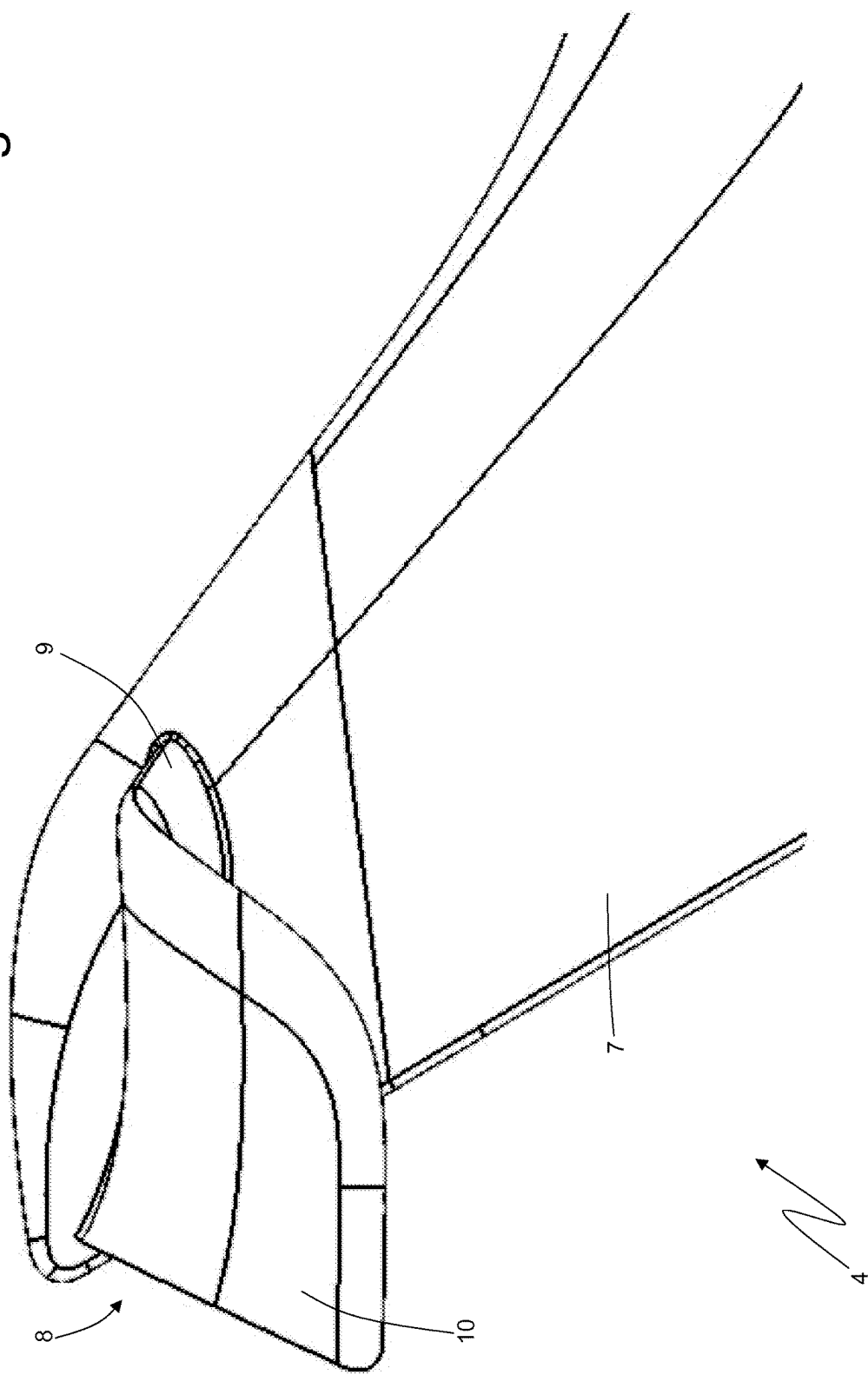

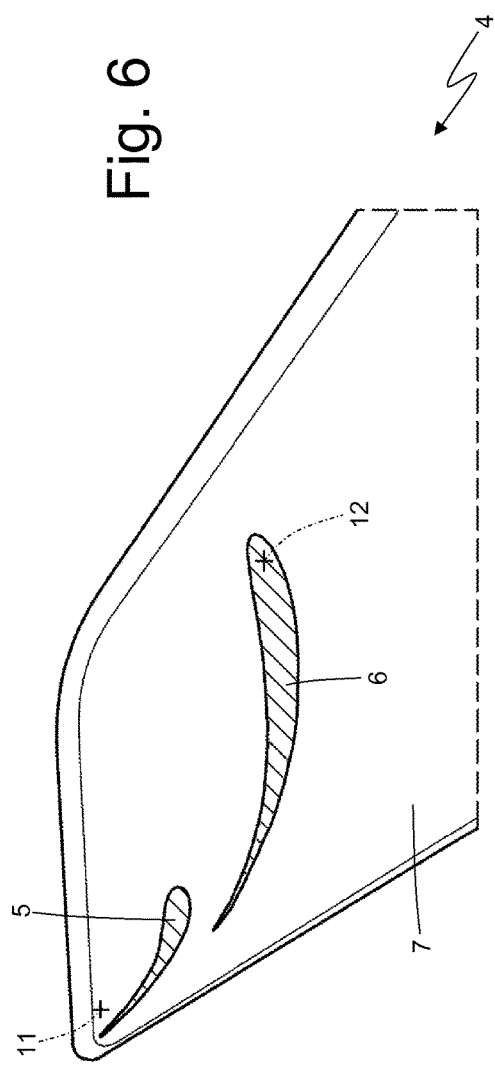
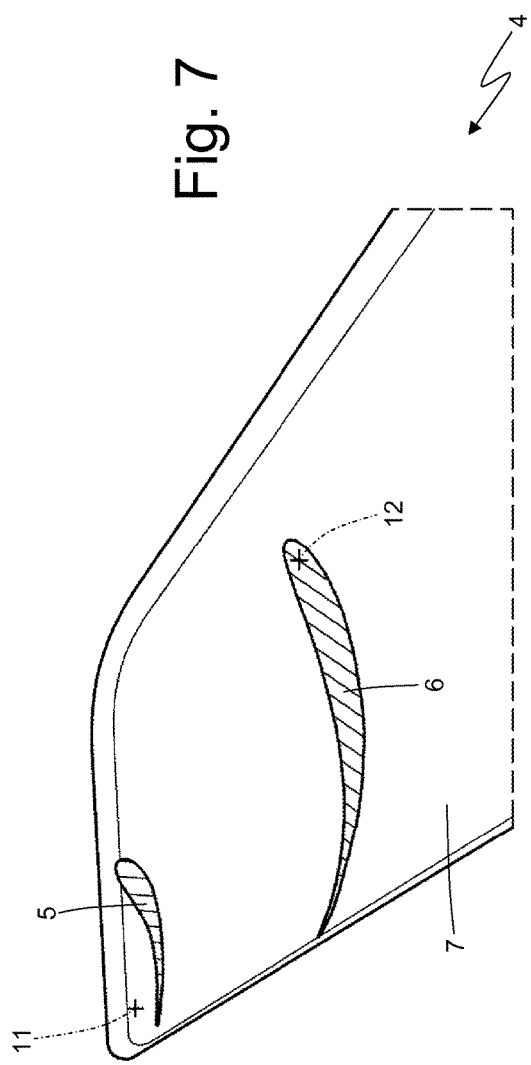

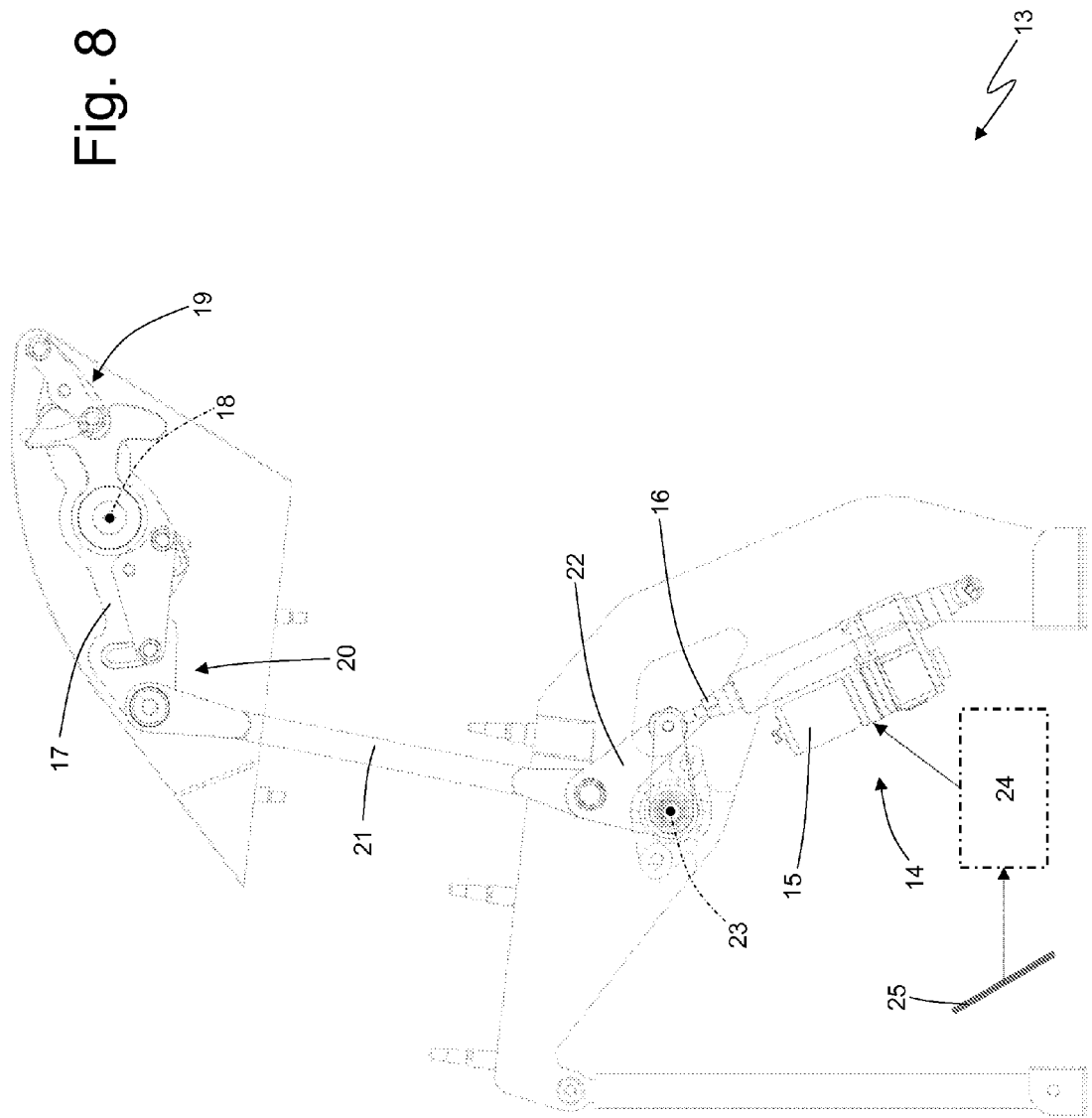

METHOD TO CONTROL A HIGH PERFORMANCE ROAD VEHICLE EQUIPPED WITH A REAR SPOILER HAVING AT LEAST ONE ADJUSTABLE AERODYNAMIC PROFILE

PRIORITY CLAIM AND RELATED APPLICATIONS

This application claims the benefit of priority under 35 U.S.C. Section 119 to Italian Patent Application Serial No. BO2012A000089, filed on Feb. 24, 2012, which application is incorporated herein by reference in its entirety.

FIELD OF THE INVENTION

The present invention relates to a method to control a high performance road vehicle equipped with a rear spoiler having at least one adjustable aerodynamic profile.

BACKGROUND

From the aerodynamic point of view, the external shape of the body of a high performance road vehicle is designed to achieve two objectives (which are often in contrast with each other): minimizing (both by reducing the overall front section and by reducing the aerodynamic penetration coefficient) the running resistance (i.e. minimizing the aerodynamic load component aligned with and opposite to the motion direction) and maximizing the downforce (i.e. maximizing the downward vertical aerodynamic load component).

In order to increase the downforce, the custom of using specific aerodynamic projecting elements is known, which projecting elements are mounted onto the road vehicle body. One of the most common aerodynamic projecting elements is the rear spoiler which is arranged at the rear portion of the vehicle and serves the function of increasing the downforce (i.e. the downward vertical aerodynamic load) which mainly rests on the rear wheels (which are driving wheels in almost all the high performance road vehicles). The rear spoiler may comprise a single centrally arranged fin-shaped support or a pair of laterally arranged fin-shaped supports (a typical solution in free-circulation or commercially available road vehicles) which support at least one horizontally arranged aerodynamic profile or airfoil and which, being impinged by the air, generate the desired lift. The rear spoiler may comprise a single aerodynamic profile (in this case it is referred to as a single-winged rear spoiler) or two, three or more vertically overlapping aerodynamic profiles (in this case it is referred to as a multi-winged rear spoiler).

A particular multi-winged configuration (generally with two or at most three aerodynamic profiles) includes a primary aerodynamic profile (referred to as "main") which is aerodynamically assisted by other ancillary aerodynamic profiles (referred to as "flaps"), the leading edges of which are located close to the trailing edge of the main aerodynamic profile to be assisted, and in a sequence, to the trailing edges of the following profiles.

If on the one hand the provision of a rear spoiler increases the downforce (positive effect), on the other hand the provision of a rear spoiler also increases the running resistance (which is a normally negative effect, but when braking), and thus the rear spoiler design should always be a compromise between these two diametrically opposite aspects in order to maximize the road vehicle performance.

In on-track driving, a rear spoiler with a high aerodynamic load is an advantage (due to the positive effect of the downforce) at average speeds (i.e. of the order of 180-240 Km/h; 112-150 mph), at which the road vehicle is strongly accelerated/decelerated and/or is driven on a bend or curve (and therefore the road vehicle wheels must transmit a very high longitudinal force and/or transversal force to the ground); on the other hand, a rear spoiler with a high aerodynamic load is a drawback (due to the negative effect of the running resistance) at high speeds (higher than 280-300 Km/h; 174-186 mph), at which the road vehicle performance is directly linked to the minimization of all the running resistance components. Accordingly, a rear spoiler has been proposed which is provided with at least one adjustable aerodynamic profile mounted to be adjusted between a maximum incidence position, for generating the maximum downforce (and thus also the maximum running resistance), which is generally used at average speeds and when braking, and a minimum incidence position for obtaining the minimum downforce (and thus also the minimum running resistance) which is generally used at high speeds.

At present, the control logic of a rear spoiler provided with adjustable aerodynamic profiles is limited to arranging the adjustable aerodynamic profiles to the minimum incidence position for obtaining the minimum downforce (and thus also the minimum running resistance) when the road vehicle is on a straight road, and to arranging the adjustable aerodynamic profiles to the maximum incidence position for generating the maximum downforce (and thus also the maximum running resistance) when the road vehicle is cornering or braking; the "straight road/corner" condition and the braking condition are typically identified and distinguished according to the steering angle and/or according to the transversal and longitudinal accelerations.

Patent application WO2010030158A1 describes a road vehicle provided with a rear spoiler with an adjustable aerodynamic profile, the position of which is continuously changed to comply with the type of motion of the vehicle (i.e. whether the vehicle is on a straight road at constant speed, is braking or is cornering). In particular, it is suggested that when the vehicle is cornering (at a high or low speed), an additional aerodynamic load is normally required to stabilize the vehicle. Summarizing, patent application WO2010030158A1 also suggests that the adjustable aerodynamic profile be arranged in the minimum incidence position for obtaining the minimum downforce (and thus also the minimum running resistance) when the road vehicle is on a straight road, and that the adjustable aerodynamic profile be arranged in the maximum incidence position for generating the maximum downforce (and thus also the maximum running resistance) when the road vehicle is cornering or braking.

U.S. Pat. No. 4,810,022A describes a car provided with adjustable front and rear spoilers, the position of which is adjusted by a servo-mechanism according to the driving requirements.

SUMMARY

The present subject matter provides a method to control a high performance road vehicle equipped with a rear spoiler that has at least one adjustable aerodynamic profile, which control method allows for a better use of the adjustable aerodynamic profile while being easy and cost-effective to be implemented.

According to the present subject matter, a method to control a high performance road vehicle equipped with a rear spoiler having at least one adjustable aerodynamic profile is provided as claimed in the appended claims.

BRIEF DESCRIPTION OF THE DRAWINGS

The present invention will now be described with reference to the accompanying drawings, which illustrate a non-limiting example thereof, in which:

FIGS. 2 and 3 show two diagrammatic, perspective views, on enlarged scale, of the rear spoiler in FIG. 1, in a maximum incidence configuration and in a minimum incidence configuration, respectively;

FIGS. 4 and 5 show two diagrammatic views, a rear view and a side view, respectively, and with parts removed for clarity, of the rear spoiler in FIG. 1;

FIGS. 6 and 7 show two diagrammatic, longitudinal section views, with parts removed for clarity, of the rear spoiler in FIG. 1, in a maximum incidence configuration and in a minimum incidence configuration, respectively;

FIG. 8 shows a diagrammatic view, with parts removed for clarity, of an actuation system of the rear spoiler in FIG. 1.

DETAILED DESCRIPTION

Figure 1:
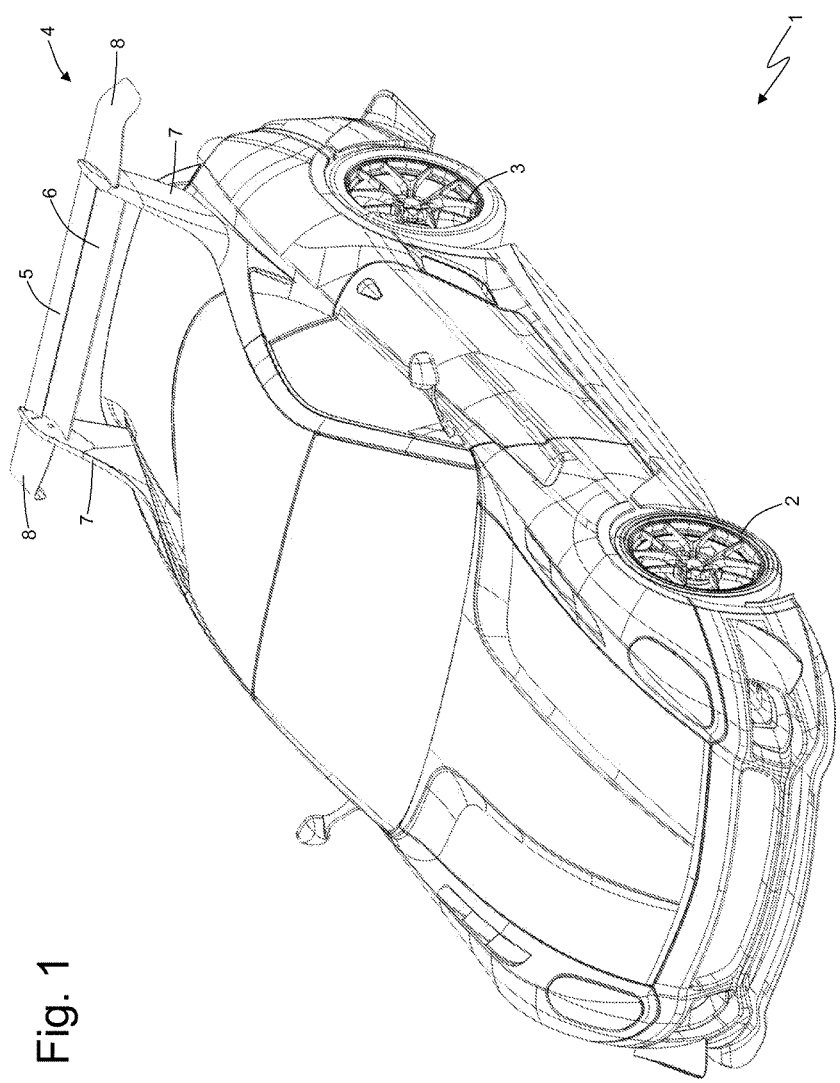
FIG. 1 shows a diagrammatic perspective view of a road vehicle provided with a rear spoiler with adjustable aerodynamic profiles which is controlled according to the control method of the present subject matter.

In FIG. 1, reference numeral 1 indicates as a whole a high performance road vehicle, provided with two front wheels 2 and two driving rear wheels 3 (in other words, the road vehicle 1 is front-wheeled).

The road vehicle 1 is provided with a two-winged rear spoiler 4 which comprises an upper adjustable aerodynamic profile 5, a lower adjustable aerodynamic profile 6, and a pair of fin-shaped supports 7 which are vertically arranged at the opposite sides of the road vehicle 1 and support the aerodynamic profiles 5 and 6. In other words, the upper aerodynamic profile 5 is mounted on the fin-shaped supports 7 at a different height and at a certain distance from the lower aerodynamic profile 6 which is therefore arranged underneath the upper aerodynamic profile 5. Each aerodynamic profile 5 and 6 has a transversal section (visible in FIGS. 6 and 7) which is shaped according to the typical pattern technically known as "aerodynamic profile" and thus having the leading edge (i.e. the spoke end) arranged at the front with respect to the forward direction and the trailing edge (i.e. the thinnest part) arranged at the back. The lower aerodynamic profile 6 is a primary aerodynamic profile (referred to as "main"), and in use, it is aerodynamically assisted by the upper aerodynamic profile 5 which is an ancillary aerodynamic profile (referred to as "flap"); to this end, the leading edge (arranged at the front) of the upper aerodynamic profile 5 is located close to the trailing edge (arranged at the back) of the lower aerodynamic profile 6 to be assisted. In other words, the leading edge (arranged at the front) of the upper aerodynamic profile 5 is located above the trailing edge (arranged at the back) of the lower aerodynamic profile 6 to be assisted. The upper aerodynamic profile 5 can be smaller than the lower aerodynamic profile 6.

Moreover, the upper aerodynamic profile 5 is arranged in a rearward position with respect to the lower aerodynamic profile 6, i.e. the tail of the upper aerodynamic profile 5 is not vertically aligned (as it is more rearward than the motion direction) with the tail of the lower aerodynamic profile 6.

According to an embodiment better shown in FIGS. 2-5, the rear spoiler 4 comprises two lateral projecting elements 8, each of which being fixed to the corresponding fin-shaped support 7 on the side opposite to the aerodynamic profiles 5 and 6; in other words, each fin-shaped support 7 has an internal face to which the aerodynamic profiles 5 and 6 are connected, and an external face opposite to the internal face to which the corresponding lateral projecting element 8 is connected. Each lateral projecting element 8 is L-shaped when viewed from the front and consists of a substantially horizontal innermost part 9 that is fixed to the external surface of the corresponding fin-shaped support 7, and of an outermost part 10 that is inclined with respect to the innermost part 9, so as to bend towards the vertical (such an inclination is also identifiable by the technical definition of "negative dihedral angle"); the outermost part 10 can form an angle between 45° and 90° with the innermost part 9.

According to what shown in FIGS. 6 and 7, the upper aerodynamic profile 5 is mounted within the fin-shaped supports 7 for rotating around a horizontal rotational axis 11 which is transversally arranged with respect to the forward direction of the road vehicle 1 and passes close to the trailing edge (arranged at the back) of the upper aerodynamic profile 5; i.e., the rotational axis 11 is arranged at the trailing edge of the upper aerodynamic profile 5. Moreover, the lower aerodynamic profile 6 is mounted within the fin-shaped supports 7 for rotating around a horizontal rotational axis 12 which is parallel to the rotational axis 11, is transversally arranged with respect to the forward direction of the road vehicle 1, and is arranged close to the leading edge (arranged at the front) of the lower aerodynamic profile 6; i.e., the rotational axis 12 is arranged at the leading edge of the lower aerodynamic profile 6. According to the above scheme, the two aerodynamic profiles 5 and 6 are hinged to the fin-shaped supports 7 in an opposite fashion: the upper aerodynamic profile 5 is hinged "at the tail" for rotating close to the trailing edge thereof (at the back with respect to the motion direction), while the lower aerodynamic profile 6 is hinged "at the head" for rotating close to the leading edge thereof.

Figure 9:
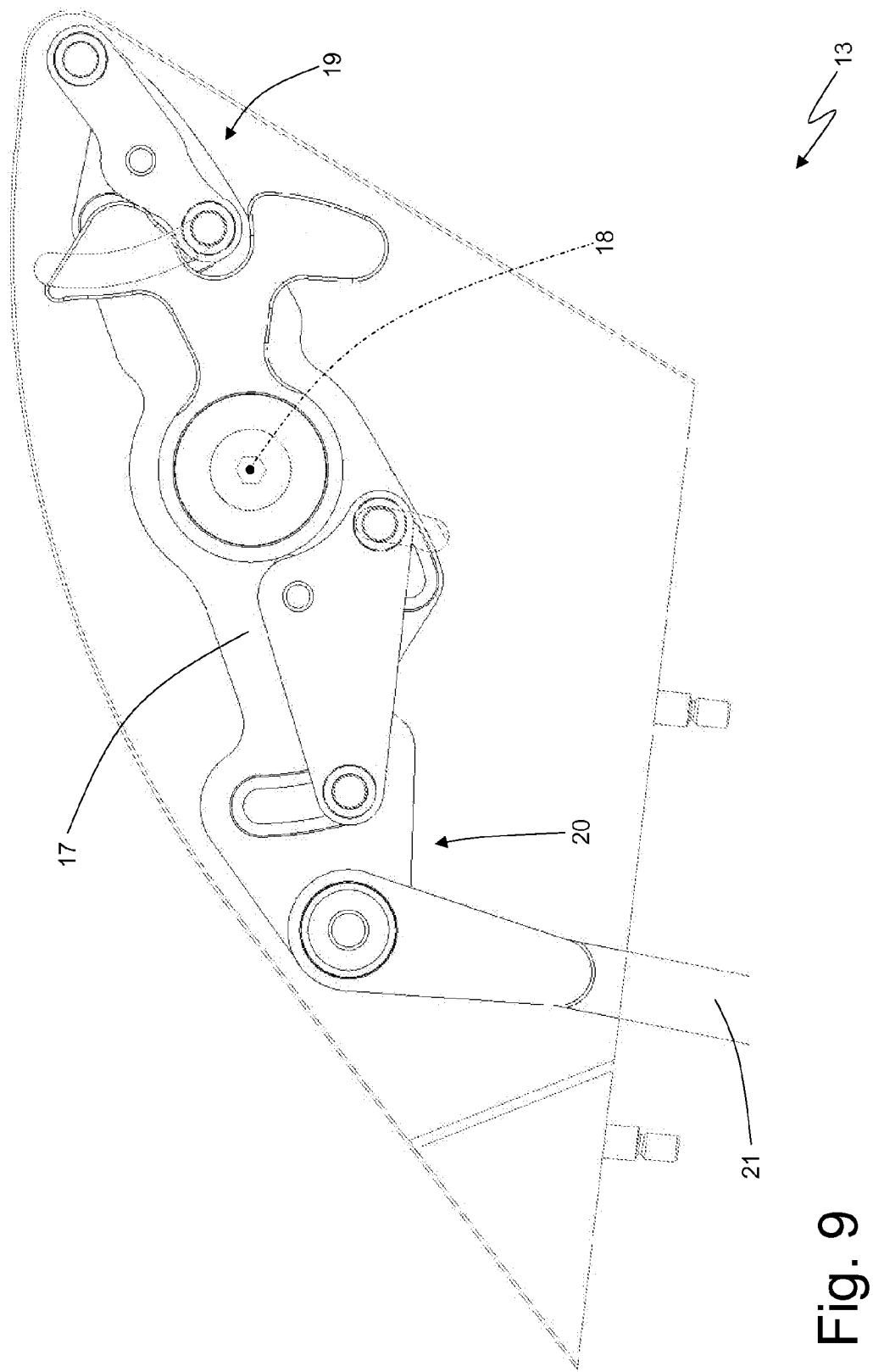
FIG. 9 shows a view on enlarged scale of a detail of FIG. 8.

As shown in FIGS. 8 and 9, a mechanical transmission 13 is provided, which connects the two aerodynamic profiles 5 and 6 to each other for generating rotations with opposite directions of the two aerodynamic profiles 5 and 6 themselves (i.e. when the upper aerodynamic profile 5 rotates in clockwise direction around its rotational axis 11, the lower aerodynamic profile 6 then rotates in counterclockwise direction around its rotational axis 12, and vice versa). Moreover, the rotations of the two aerodynamic profiles 5 and 6 around the corresponding rotational axes 11 and 12, and generated by the mechanical transmission 13, occur according to a kinematic law which provides for a fixed ratio between the corresponding angular strokes. In other words, the mechanical transmission 13 makes the two aerodynamic profiles 5 and 6 angularly integral with each other so that a rotation of one of the two aerodynamic profiles 5 or 6 always corresponds to an equivalent rotation of the other aerodynamic profile 6 or 5 according to a fixed ratio. The transmission ratio can be between the two aerodynamic profiles 5 and 6 such that the angle of rotation of the upper aerodynamic profile 5 around the rotational axis 11 is larger than the corresponding angle of rotation of the lower aerodynamic profile 6 around the rotational axis 12. In the embodiment shown in the accompanying drawings, the ratio of the angle of rotation of the upper aerodynamic profile 5 around the rotational axis 11 to the corresponding angle of rotation of the lower aerodynamic profile 6 around the rotational axis 12 is equal to 4; in other words, when the lower aerodynamic profile 6 makes a 1° rotation around the rotational axis 12, the upper aerodynamic profile 5 makes a 4° rotation around the rotational axis 11, and vice versa. It is apparent that such a transmission ratio may be changed according to the aerodynamic features to be obtained and/or according to the particular pattern of the aerodynamic contours of the subject aerodynamic profiles 5 and 6.

In the embodiment shown in the accompanying drawings, a single actuator 14 is mechanically connected to the mechanical transmission 13 which causes both aerodynamic profiles 5 and 6 to rotate simultaneously around their respective rotational axes 11 and 12. In the embodiment shown in the accompanying drawings, actuator 14 consists of rotatable electric motor 15 which transmits the motion to a piston 16 which axially slides forward or backward according to the direction of rotation of the electric motor 15.

Mechanical transmission 13 and actuator 14 are located completely within the corresponding fin-shaped support 7.

The mechanical transmission 13 comprises a rocker arm 17 which is hinged to the structure of the fin-shaped support 7 to rotate around a horizontal rotational axis 18 that is parallel to the two rotational axes 11 and 12 of the aerodynamic profiles 5 and 6, and is arranged between the two rotational axes 11 and 12 of the aerodynamic profiles 5 and 6. Rocker arm 17 has an extremity 19 that is mechanically connected to the upper aerodynamic profile 5 in order to transmit motion to the upper aerodynamic profile 5 itself, and an extremity 20 that is opposite to extremity 19 with respect to the rotational axis 18 and is mechanically connected to the lower aerodynamic profile 6 in order to transmit motion to the lower aerodynamic profile 6 itself.

The mechanical transmission 13 comprises a rod 21 that secures the extremity 20 of rocker arm 17 to the actuator 14. The mechanical transmission 13 can comprise a rocker arm 22 which is hinged to a structure of the fin-shaped support 7 of the road vehicle 1 to rotate around a horizontal rotational axis 23 that is parallel to the two rotational axes 11 and 12 of the aerodynamic profiles 5 and 6; rocker arm 22 has a first extremity hinged to rod 21 and a second extremity 20 hinged to the sliding piston 16 of actuator 14.

According to two alternative embodiments, a single mechanical transmission 13 may be provided which is arranged inside only one of the two fin-shaped supports 7, or two mechanical transmissions 13 may be provided which are identical to each other and are arranged mirror-wise inside the respective fin-shaped supports 7. When two mechanical transmissions 13 are provided, an embodiment provides for both mechanical transmissions 13 to be provided with their own actuator 14 and to be connected to each other only by means of the aerodynamic profiles 5 and 6 (i.e. no other mechanical connection is provided between the mechanical transmissions 13 besides the aerodynamic profiles 5 and 6). As an alternative, a single (active) mechanical transmission 13 of actuator 14 may be provided, while the other (passive) mechanical transmission has no actuator 14; in this case, an external mechanical connection (independent of the aerodynamic profiles 5 and 6) may be provided, which mechanically secures the two mechanical transmissions 13 and which engages the active mechanical transmission 13 at the actuator 14.

Actuator 14 or actuators 14 (if they are both provided) may be controlled by a control unit 24 (diagrammatically shown in FIG. 8) in order to move the two aerodynamic profiles 5 and 6 between a minimum incidence limit or "completely open" position (shown in FIGS. 3 and 7), in which the aerodynamic profiles 5 and 6 provide the minimum downforce (and thus also a minimum running resistance), and a maximum incidence limit or "completely closed" position (shown in FIGS. 2 and 6), in which the aerodynamic profiles 5 and 6 provide the maximum downforce (and thus also a maximum running resistance).

The control unit 24 assesses, in use, the (actual) instant tendency of the road vehicle 1 and compares the (actual) instant tendency of the road vehicle 1 with corresponding reference models in order to define the position of the aerodynamic profiles 5 and 6 of the rear spoiler 4; thereby, the (actual) instant tendency of the road vehicle is to instability (e.g. in case of understeering or oversteering), the control unit 24 conveniently adjusts the position of the aerodynamic profiles 5 and 6 of the rear spoiler 4 in an attempt to oppose the instability, i.e. in an attempt to stabilize the road vehicle 1. The adjustment of the position of the adjustable aerodynamic profiles 5 and 6 of the rear spoiler 4 is differentiated according to the position of a selector located in the compartment (the so-called "manettino" dial) which is operated by the driver of the road vehicle 1 for selecting the operating mode of the control unit 24 (e.g. for choosing between an operating mode that favors the driving safety and an operating mode that favors the maximum performance).

According to an embodiment, the control unit 24 detects, in use, the tendency to oversteer/understeer when cornering; oversteering/understeering tendency means the road vehicle 1 deviating from the trajectory imposed by the steering wheel, i.e. the road vehicle 1 tending to travel over a trajectory with a radius differing from that imposed by the steering wheel, when cornering. By oversteering it is meant the tendency to narrow the trajectory set with the steering wheel, vice versa the understeering condition corners with a larger radius than the radius set. The oversteering/understeering tendency when cornering may be detected according to any one of the methods known in the literature. By way of example, the oversteering/understeering tendency when cornering may be detected by comparing the time evolution of the steering angle (which is normally detected by a position sensor coupled to the steering system) to the time evolution of the yaw angle (which is normally detected by an inertial sensor mounted onto the road vehicle 1).

The control unit 24 moves (obviously if possible, i.e. if the aerodynamic profiles 5 and 6 of the rear spoiler 4 are not already in the maximum incidence limit position) the aerodynamic profiles 5 and 6 of the rear spoiler 4 towards a position of greater incidence for increasing the overall downforce generated by the rear spoiler 4 if the tendency to oversteer is detected when cornering; by moving the aerodynamic profiles 5 and 6 of the rear spoiler 4 towards a greater incidence position, the load on the driving rear wheels 3 is increased, and thus the oversteering tendency is reduced since the "aerodynamic balance" is moved to the rear axle.

Moreover, the control unit 24 moves (obviously if possible, i.e. if the aerodynamic profiles 5 and 6 of the rear spoiler 4 are not already in the minimum incidence limit position) the aerodynamic profiles 5 and 6 of the rear spoiler 4 towards a position of smaller incidence for decreasing the overall downforce generated by the rear spoiler 4 if the tendency to understeer is detected when cornering; by moving the aerodynamic profiles 5 and 6 of the rear spoiler 4 towards a smaller incidence position, the load on the driving rear wheels 3 is decreased, and thus the understeering tendency is reduced since the "aerodynamic balance" is moved to the front axle.

According to a possible embodiment, the control unit 24 detects when the road vehicle 1 enters a corner (for example by observing the steering angle and the running speed which, when entering a corner, should always be decreasing), and therefore the control unit 24 sets the aerodynamic profiles 5 and 6 of the rear spoiler 4 to an intermediate position between the minimum incidence position and the maximum incidence position if it is detected that the road vehicle 1 is entering a corner. Thereby, when cornering, the control unit 24 has the possibility of adjusting the position of the aerodynamic profiles 5 and 6 of the rear spoiler 4 for opposing both an oversteering tendency of the road vehicle 1 (by increasing the incidence of the aerodynamic profiles 5 and 6 of the rear spoiler 4), and an understeering tendency of the road vehicle 1 (by decreasing the incidence of the aerodynamic profiles 5 and 6 of the rear spoiler 4).

It is worth noting that arranging the aerodynamic profiles 5 and 6 of the rear spoiler 4 to an intermediate position between the minimum incidence position and the maximum incidence position when entering a corner is not an action aimed to maximize the performance (in fact, the maximum performance always requires to have the maximum downforce possible when cornering), but it is an action aimed to ensure a certain safety margin as the control unit 24 still has the possibility (i.e. maneuvering margin) of adjusting the aerodynamic profiles 5 and 6 of the rear spoiler 4, if needed, so as to oppose an oversteering tendency and thus balance the road vehicle 1. By means of the selector located in the compartment (the so-called "manettino" dial), the driver of the road vehicle 1 can generally select the operating mode of the control unit 24 so as to always have the maximum performance in any condition, or so as to ensure a certain operating margin for the control unit 24 to balance the road vehicle 1 if needed.

According to a possible embodiment, the control unit 24 detects if the rear driving wheels 3 of the road vehicle 1 are slipping, and thus the control unit 24 moves the aerodynamic profiles 5 and 6 of the rear spoiler 4 to the maximum incidence position for maximizing the overall downforce generated by the rear spoiler 4 if a slipping of the rear driving wheels 3 is detected.

According to a possible embodiment, the control unit 24 detects the force applied on a brake pedal (diagrammatically shown in FIG. 8), and thus the control unit 24 moves the aerodynamic profiles 5 and 6 of the rear spoiler 4 towards the maximum incidence position for maximizing the overall downforce generated by the rear spoiler 4 while offering the maximum running resistance if the force on the brake pedal 25 exceeds a predetermined threshold.

The control unit 24 can always assess a running speed of the road vehicle 1, and thus the control unit 24 can move the aerodynamic profiles 5 and 6 of the rear spoiler 4 only if the running speed of the road vehicle exceeds a predetermined threshold (which may be differentiated according to whether the road vehicle 1 is cornering/entering a corner, braking or accelerating). Such a check of the running speed of the road vehicle 1 allows an unnecessary maneuvering of the aerodynamic profiles 5 and 6 of the rear spoiler 4 to be prevented when the running speed of the road vehicle 1 is too low, i.e. when the aerodynamic effect generated by the rear spoiler 4 is negligible (i.e. substantially irrelevant).

The above-described control method allows the aerodynamic profiles 5 and 6 of the rear spoiler 4 to be used for stabilizing the road vehicle 1 when cornering in case of an oversteering tendency or in case of an understeering tendency. Thereby, the rear spoiler 4 may be used not only as a performance element for maximizing the performance, but also as a safety element for balancing the road vehicle 1 in case of an oversteering tendency or in case of an understeering tendency. As mentioned above, the driver of the road vehicle 1 can select, by means of a selector located in the compartment (the so-called "manettino" dial) the operating mode of the control unit 24 so as to always have the maximum performance in any condition, or so as to ensure a certain operating margin for the control unit 24 to balance the road vehicle 1 if needed.

In other words, the above-described control method allows the dynamic stability of the road vehicle 1 to be electronically managed when cornering (by automatically adjusting the rear spoiler 4); such an electronic management of the dynamic stability of the road vehicle allows the performance to be maximized by suitably adjusting the oversteering and understeering balance of the road vehicle 1 obtained by the mere mechanical setting (i.e. essentially by dimensioning the front and rear tires). Thereby, an optimal cornering behavior, meant as a compromise between the lateral stability of the road vehicle 1 (stable vehicle) and the maximization of the mere mechanical performance (unstable vehicle), can be always obtained.

By virtue of the use of the above-described control method, a mechanical setting of the road vehicle 1 which tends to instability (i.e. to a very reactive and highly control-sensitive/ready behavior which is typical of racing prototypes) is possible because, by suitably managing the rear spoiler 4, a greater stability can be imparted to the road vehicle 1 (when cornering) by at least partially compensating for an understeering or oversteering tendency. That is, by virtue of the management of the rear spoiler 4 according to the above-described control method, it is possible to stabilize the cornering behavior of the road vehicle 1 which, due to its mechanical setting, would tend to instability. For example, very large front tires may be used, which allow the grip (and thus both the cornering speed and the braking performance) to be strongly increased, but which on the other hand make the cornering behavior of the road vehicle 1 less stable (i.e. more reactive).

The invention claimed is:

1. A method to control a high performance road vehicle equipped with a rear spoiler that has at least one adjustable aerodynamic profile, the method comprising:
    detecting a trajectory of the road vehicle corresponding to oversteering or understeering when cornering with a control unit;
    adjusting a setting of the adjustable aerodynamic profile of the rear spoiler with the control unit to a higher angle of incidence in order to increase a downforce generated by the rear spoiler when oversteering is detected when cornering; and
    adjusting the setting of the adjustable aerodynamic profile of the rear spoiler with the control unit to a lower angle of incidence in order to reduce the downforce created by the rear spoiler when understeering is detected when cornering.

2. A control method as claimed in claim 1 and further comprising the following steps:
    detecting when the road vehicle enters a corner; and
    setting the adjustable aerodynamic profile of the rear spoiler to an intermediate position between a maximum incidence position and a minimum incidence position when the road vehicle enters the corner.

3. A control method as claimed in claim 1 and further comprising the following steps:
measuring a force applied on a brake pedal; and
setting the adjustable aerodynamic profile of the rear spoiler to a maximum incidence position when the force applied on the brake pedal exceeds a first predefined threshold, so that the downforce created by the rear spoiler is maximized.

4. A control method as claimed in claim 1 and further comprising the following steps:
detecting when rear drive wheels of the road vehicle are slipping; and
setting the adjustable aerodynamic profile of the rear spoiler to a maximum incidence position in order to maximize the downforce created by the rear spoiler when slipping of the rear drive wheels is detected.

5. A control method as claimed in claim 1 and further comprising the following steps:
assessing a vehicle ground speed of the road vehicle; and
adjusting the setting of the adjustable aerodynamic profile of the rear spoiler only when the vehicle ground speed of the road vehicle exceeds a second predefined threshold.

6. A method to control a high performance road vehicle equipped with a rear spoiler that has at least one adjustable airfoil, the method comprising:
detecting oversteering or understeering of the road vehicle when cornering with a control unit;
adjusting a setting of the adjustable airfoil of the rear spoiler with the control unit to a higher angle of incidence in order to increase a downforce generated by the rear spoiler when oversteering is detected when cornering; and
adjusting the setting of the adjustable airfoil of the rear spoiler with the control unit to a lower angle of incidence in order to reduce the downforce created by the rear spoiler when understeering is detected when cornering.

7. A control method as claimed in claim 6 and further comprising the following steps:
detecting when the road vehicle enters a corner; and
setting the adjustable airfoil of the rear spoiler to an intermediate position between a maximum incidence position and a minimum incidence position when the road vehicle enters the Corner.

8. A control method as claimed in claim 6 and further comprising the following steps:
measuring a force applied on a brake pedal; and
setting the adjustable airfoil of the rear spoiler to a maximum incidence position when the force applied on the brake pedal exceeds a first predefined threshold, so that the downforce created by the rear spoiler is maximized.

9. A control method as claimed in claim 6 and further comprising the following steps:
detecting when rear drive wheels of the road vehicle are slipping; and
setting the adjustable airfoil of the rear spoiler to a maximum incidence position in order to maximize the downforce created by the rear spoiler when slipping of the rear drive wheels is detected.

10. A control method as claimed in claim 6 and further comprising the following steps:
assessing a vehicle ground speed of the road vehicle; and
adjusting the setting of the adjustable airfoil of the rear spoiler only when the vehicle ground speed of the road vehicle exceeds a second predefined threshold.

11. A method to control a high performance road vehicle equipped with a rear spoiler that has at least one adjustable aerodynamic profile, the method comprising:
determining a trajectory of the road vehicle imposed by orientation of front wheels of the road vehicle with a control unit;
detecting a trajectory deviation of the road vehicle from the imposed trajectory with the control unit corresponding to oversteering or understeering when cornering;
adjusting a setting of the adjustable aerodynamic profile of the rear spoiler to a higher angle of incidence in order to increase a downforce generated by the rear spoiler when oversteering is detected when cornering; and
adjusting the setting of the adjustable aerodynamic profile of the rear spoiler to a lower angle of incidence in order to reduce the downforce created by the rear spoiler when understeering is detected when cornering.

12. A control method as claimed in claim 11 and further comprising the following steps:
detecting when the road vehicle enters a corner; and
setting the adjustable aerodynamic profile of the rear spoiler to an intermediate position between a maximum incidence position and a minimum incidence position when the road vehicle enters the corner.

13. A control method as claimed in claim 11 and further comprising the following steps:
measuring a force applied on a brake pedal; and
setting the adjustable aerodynamic profile of the rear spoiler to a maximum incidence position when the force applied on the brake pedal exceeds a first predefined threshold, so that the downforce created by the rear spoiler is maximized.

14. A control method as claimed in claim 11 and further comprising the following steps:
detecting when rear drive wheels of the road vehicle are slipping; and
setting the adjustable aerodynamic profile of the rear spoiler to a maximum incidence position in order to maximize the downforce created by the rear spoiler when slipping of the rear drive wheels is detected.

15. A control method as claimed in claim 11 and further comprising the following steps:
assessing a vehicle ground speed of the road vehicle; and
adjusting the setting of the adjustable aerodynamic profile of the rear spoiler only when the vehicle ground speed of the road vehicle exceeds a second predefined threshold.

16. A method to control a high performance road vehicle equipped with a rear spoiler that has at least one adjustable airfoil, the method comprising:
measuring a steering angle of the vehicle over a predetermined time period with a position sensor;
measuring a yaw angle of the vehicle during the predetermined time period with an inertia sensor;
detecting oversteering or understeering of the road vehicle when cornering by comparing the measured steering angle to the measured yaw angle;
adjusting a setting of the adjustable airfoil of the rear spoiler to a higher angle of incidence in order to increase a downforce generated by the rear spoiler when oversteering is detected when cornering; and
adjusting the setting of the adjustable airfoil of the rear spoiler to a lower angle of incidence in order to reduce the downforce created by the rear spoiler when understeering is detected when cornering.

17. A control method as claimed in claim 16 and further comprising the following steps:
   detecting when the road vehicle enters a corner; and
   setting the adjustable airfoil of the rear spoiler to an intermediate position between a maximum incidence position and a minimum incidence position when the road vehicle enters the corner.

18. A control method as claimed in claim 16 and further comprising the following steps:
   measuring a force applied on a brake pedal; and
   setting the adjustable airfoil of the rear spoiler to a maximum incidence position when the force applied on the brake pedal exceeds a first predefined threshold, so that the downforce created by the rear spoiler is maximized.

19. A control method as claimed in claim 16 and farther comprising the following steps:
   detecting when rear drive wheels of the road vehicle are slipping; and
   setting the adjustable airfoil of the rear spoiler to a maximum incidence position in order to maximize the downforce created by the rear spoiler when slipping of the rear drive wheels is detected.

20. A control method as claimed in claim 16 and further comprising the following steps:
   assessing a vehicle ground speed of the road vehicle; and
   adjusting the setting of the adjustable airfoil of the rear spoiler only when the vehicle ground speed of the road vehicle exceeds a second predefined threshold.

\* \* \* \* \*